Patented July 14, 1931

1,814,073

UNITED STATES PATENT OFFICE

HERMAN E. BAKKEN, OF NIAGARA FALLS, NEW YORK, ASSIGNOR TO AMERICAN MAGNESIUM CORPORATION, OF NIAGARA FALLS, NEW YORK, A CORPORATION OF NEW YORK

PURIFICATION OF CALCIUM

No Drawing.  Application filed March 10, 1926.  Serial No. 93,780.

My invention relates to metallic calcium and especially to purification of the same. One object of the invention is to provide a commercially practical method which can be employed to transform crude or impure calcium into metal of a higher degree of purity, and which also is especially adapted for removing relatively non-volatile impurities, either metallic or non-metallic in character. Another object is to produce pure calcium in the form of crystalline aggregates, which can be formed directly into rod, wire or other desired shapes, without intermediate melting and casting. Furthermore, since much of the metallic calcium commercially available varies greatly in composition, commonly containing only 70 to 80 per cent of the metal or even less, my pure form is advantageous for making alloys containing calcium, enabling the correct addition of the metal to be made with ease and without incorporating undesirable impurities at the same time.

Metallic calcium is commonly made by electrolysis of fused anhydrous calcium chloride, with or without the addition of other salts to the bath. In one method the calcium is deposited upon an iron cathode, which is located at the upper surface of the bath. The metallic calcium solidifies either upon the electrode or upon the surface of the bath and is removed at suitable intervals. The conditions under which the calcium is collected are usually such that more or less bath material is included in and contaminates the metal. Also, because of its chemical activity, particularly at the operating temperatures at which it is produced, metallic calcium tends to react with moist air to form oxide, hydride, and nitride. The presence of any of such compounds is undesirable from the standpoint of fabrication of the metal.

Various attempts have been made to refine impure calcium, most of which have been by way of distillation, either directly or indirectly. For example, it has been proposed to obtain pure calcium by formation of the hydride, decomposition of this compound, and subsequent distillation at temperatures of 900° C. or more.

Since calcium melts at about 810° C., and boils under atmospheric pressure at about 1240° C., it will be evident that ordinary distillation processes are not in general suited to commercial practice, both on account of the high temperatures involved and on account of the fact that distillation cannot be carried out in air or the ordinary "inert" gases such as nitrogen, hydrogen, etc., because of the reactivity of the metal. Nor do such processes yield an especially pure product. Attempts at distillation under reduced pressure have also been unsuccessful commercially.

The present invention is based upon my discovery that impure calcium or calcium alloy can be sublimed rapidly if it is heated at a temperature below the melting point and under a pressure which is less than the vapor pressure of the metal in the retort at the temperatures applied. The metal then passes directly into vapor without passing through the liquid state. The high temperature necessary for distillation is thus avoided, and if suitable condensing means are provided, a rapid and efficient purification is obtained. According to the best data available calcium possesses a vapor pressure of about 0.2 mm. mercury at 700° C., and about 1.8 mm. at 800° C. The melting point is approximately 810° C. at atmospheric pressure.

In carrying out my invention in the preferred manner a convenient charge of crude or impure material containing metallic calcium is placed in a suitable retort which is provided with any convenient heating means. The retort is also equipped with means for condensing the metal vapor and with means for applying and maintaining a high vacuum. Various types of apparatus can be used for the purpose, but I prefer that described in my copending application Serial No. 598,292, filed November 1, 1922, now Patent No. 1,594,344, issued August 3, 1926, to which reference may be made for a full description. It is here sufficient to say that the apparatus comprises a cast steel cylindrical retort, heated by electrical resistance units and having welded to it a thinner upper portion which forms the condenser. The latter may be satisfactorily cooled by radiation into the air, but other cooling means, as for example water coils, may be and preferably are employed, to afford accurate control of the condenser temperature and maintain a constant temperature gradient therein. For this purpose thermostatic control may be used if desired. The condenser preferably contains a removable split steel liner, upon which the metal vapors condense. This feature makes for easy removal of the solid condensed metal. The lower end of the retort is permanently closed, and the upper end of the condenser is a charging opening closed by a cover which is provided with suitable means for making a gas-tight joint. The apparatus is also provided with appropriate means for applying and maintaining the necessary high vacuum within.

To illustrate the operation of my process as preferably carried out the following example is given. A charge of seventy-five pounds of commercial calcium in the form of thin plates was charged into the retort, and the system was evacuated while applying heat. In the course of an hour the retort temperature was raised to 390° C., the pressure inside the retort reduced to 0.6 mm. of mercury. At the end of one and one-half hours the temperature was 420° C. and the pressure 0.34 mm. During the next two and one-half hours the temperature rose slowly to 500° C., the pressure decreasing gradually to 0.24 mm. At the end of this period the temperature quickly mounted to 780° C., and varied from this valve to about 800° C. from then until the end of the run, six and one-half hours later. During this last stage the pressure fell to 0.18 mm. of mercury and remained at that point. The entire period of heating was 11 hours. In this period substantially all the volatile metal was evaporated, leaving in the retort a residue of about 5 pounds, mostly less volatile material. The metal in the lower portion of the condenser, amounting to about 47 pounds, was 99.778 per cent pure calcium in the form of crystalline aggregates of a brilliant silvery lustre when fractured. The outer surfaces were faintly yellowish. The rest of the deposit, amounting to about 23 pounds, was contaminated with metal more volatile than calcium, chiefly sodium. By maintaining the condensing surfaces at a substantially unvarying temperature gradient the more volatile impurities are caused to condense largely in the cooler upper portion of the condenser and a substantial separation (spatially) of the calcium therefrom is effected. In general the subliming temperature should not be under about 500° C.

My process is capable of producing calcium of such high purity that the metal crystals can be welded together or united by pressure, forming a substantially homogeneous mass, and can be fabricated into many structural forms without melting and casting, thus avoiding the dangers of burning and contamination incident to fusion. For example the crystallized metal may be placed in the cylinder of an extrusion press and extruded directly into the form of rod, wire, and in fact into practically any form producible by extrusion. In one example of such an operation, a cylinder three inches in diameter and eight inches in length, inside, heated to about 360° C., was filled with the crystallized calcium and pressure applied. The metal was extruded through a 3/8 inch die under a pressure of 240 tons, which dropped to about 200 tons as soon as the metal was moving well through the die. A homogeneous rod of calcium was produced in this way. If the metal is pushed through the die too rapidly the surface tends to silver but if this difficulty is encountered it can be avoided by decreasing the speed of extrusion. Of course the extrusion temperature can be varied, according to the size of the die opening and to the pressure employed.

It is to be understood that the invention is not limited to the details herein specifically described but can be carried out in other ways without departure from its spirit.

I claim—

A process of purifying calcium, comprising evaporating impure calcium without fusion, and condensing the metallic vapor on a condensing surface while maintaining on the latter a substantially unvarying temperature gradient.

In testimony whereof I hereto affix my signature.

HERMAN E. BAKKEN.